(No Model.)
L. EBERHART & I. D. STEVENS.
BROADCAST SEED SOWER.
No. 316,019. Patented Apr. 21, 1885.
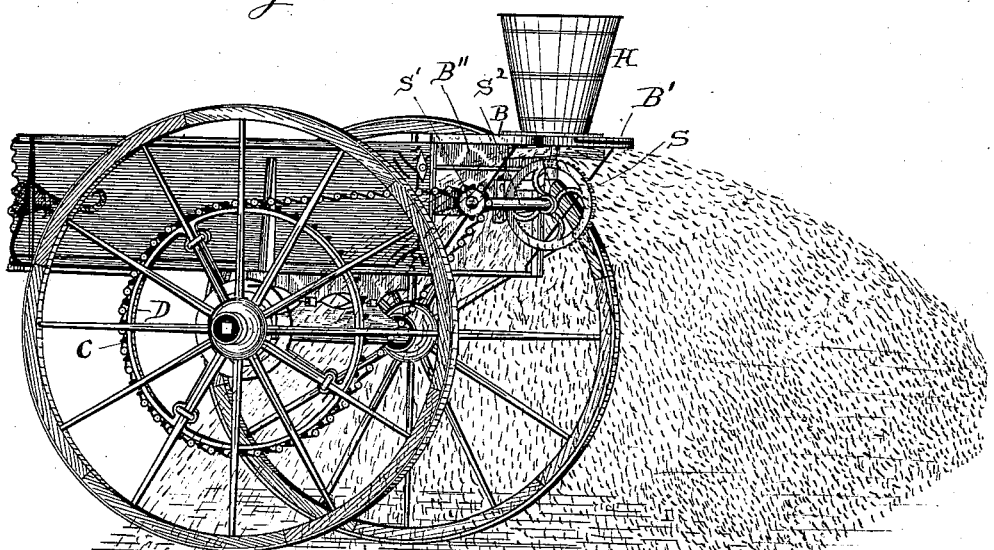
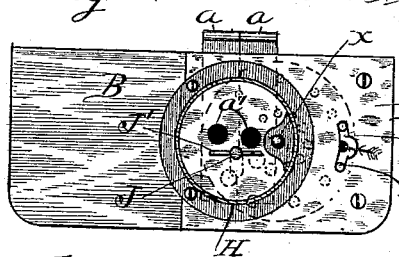
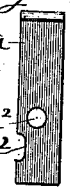
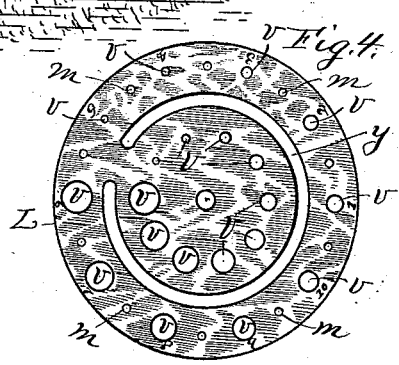
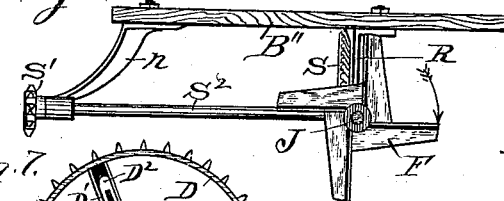
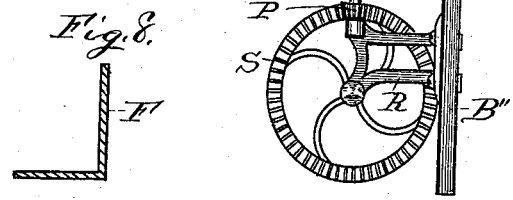
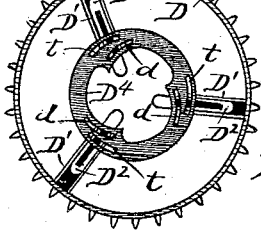
Witnesses,
Thos. H. Hutchins.
Wm. J. Hutchins.
Inventors,
Lloyd Eberhart,
Irving D. Stevens.

UNITED STATES PATENT OFFICE.

LLOYD EBERHART AND IRVING D. STEVENS, OF JOLIET, ILLINOIS.

BROADCAST SEED-SOWER.

SPECIFICATION forming part of Letters Patent No. 316,019, dated April 21, 1885.

Application filed January 5, 1885. (No model.)

*To all whom it may concern:*

Be it known that we, LLOYD EBERHART and IRVING D. STEVENS, citizens of the United States of America, residing at Joliet, in the county of Will and State of Illinois, have invented certain new and useful Improvements in Broadcast Seed-Sowers, of which the following is a specification, reference being had therein to the accompanying drawings.

This invention relates to certain improvements in broadcast seed-sowers of that class designed to be attached to a wagon and driven by means of a sprocket-chain from a sprocket-wheel attached to the wagon-wheel, which improvements are fully set forth in the following specification and claims, reference being had to the annexed drawings, making a part of this specification, in which—

Figure 1 is a perspective view of the device attached to a wagon and shown in operation sowing seed broadcast. Fig. 2 is a plan view on the top of the seeder; Fig. 3, a plan view on the side of one of the cut-off slides; Fig. 4, a plan view of the rotating perforated disk or plate through the holes of which the seed drops; Fig. 5, a plan view on the top of the gearing on a line immediately above the seed-distributer; Fig. 6, an end view showing the gearing and seed-distributer; Fig. 7, a side view of drive sprocket-wheel for attachment to the wagon-wheel, and Fig. 8 a cross-section of one of the arms of the seed-distributer.

In the drawings, B″ represents a board which takes the place of the rear end board of the wagon-box, to which board is secured the brackets $n$ and R, which support the shafts $S^2$ and J, and bevel gear-wheels S and P, as shown in Figs. 1, 2, 6.

B is a horizontal board having its inner edge secured to the upper edge of board B″, as shown in Figs 1 and 6, forming a table for the support of the hopper H and parts immediately below it. The perforated circular revolving plate L shown in Fig. 4 lies on the table B, between it and an upper cap-plate, B′, in the position with relation to the hopper as shown in Fig. 2 by the dotted lines, and is held therein by means of a bolt passing through its center, forming an axle on which it revolves, as shown in said figure. The hopper H sets on the upper surface of cap-plate B′, in the position shown in Figs. 1 and 2, and is secured thereto by means of proper screws or bolts. The center of perforated disk L is located at one side of the center of the hopper, as shown in Fig. 2, so the seed-dropping holes V V in said plate will be located about central in the hopper H. The vertical shaft J stands in a step in bracket R, and passes up through table B, in which it is boxed, annular slot Y in disk L, and through cap-plate P′, as shown in Figs. 2 and 6, and has a pin, J′, passing through it, to stir the seed in the hopper, so it will not clog the seed-holes. Disk L is provided with the two annular rows of graduated seed-holes, $v\ v$, a row of small holes, $m$, of equal size, located centrally between the holes of the outer row of seed-holes, and an annular slot, $y$, through which shaft J passes. Slot $y$ permits said disk to be rotated notwithstanding shaft J passes through it. The seed-holes $v\ v$ in each row correspond with each other in size, and seed may be dropped through one or both at a time, as may be desired. The disk L is so set that seed in dropping through the holes $v\ v$ will drop on each side of shaft J on the arms of the distributer, which is necessary for the reason that when seed is dropped from a single hole on the distributer it will be thrown more to one side than the other. When the two seed-holes are used located to drop seed, as shown, the seed is evenly distributed directly in the rear of the machine. The holes $v\ v$ are so arranged in the plate or disk L that when a pair are under the hopper, as shown in Fig. 2, one will be a little nearer the wagon than the other, which facilitates an even distribution of the seed immediately in the rear, as stated. Corresponding holes, $a'\ a'$, in cap-plate B′ permit the seed from the hopper to drop through holes $v\ v$ in disk L. A pair of slides, $a\ a$, located between cap-plate B′ and disk L, and having corresponding seed-holes, $a^2$, furnish means for shutting off the flow of grain through the holes $v\ v$ in the disk L. The quantity of seed to be dropped is regulated by the size of the feed-holes $v\ v$ in the disk L. The disk can be rotated to bring a pair of any sized holes $v\ v$ under the hopper H. The two slides $a$ each have opposite corresponding notches, $J^2$, as shown in Figs. 2 and 3, for the purpose of permitting shaft J to pass up between them, and by which shaft they are prevented from being withdrawn from the machine. Cap-plate B' is provided with the slot z, (shown in Fig. 2,) which is located over the row of small holes m in disk L, and is intended to be just long enough so two holes m will show in it, as shown in said figure. These holes m furnish means for rotating disk L by means of a pin inserted therein. The seed-holes v v are numbered so as to indicate what sized seed-holes are being brought under the hopper. The number of the seed-holes under the hopper is indicated on the opposite side of the disk, so as to show through slot z in cap-plate B', so it can be readily seen through said slot what sized holes are under the hopper. By inserting a pin in a hole m at one end of slot z, and rotating the disk L as far as the said slot is long, the discharge-holes v v will always be left in line and under the holes a' a' in cap-plate B' and holes $a^2$ in slides a, so the seed will fall through on the distributer below, consisting of the radial arms F on the upper end of shaft J, formed in cross-section, as shown in Fig. 8. As the seed falls on the arms of the distributer, it is sown broadcast, as shown in Fig. 1, by means of the revolution of said distributer. Motion is imparted to the distributer by means of the bevel-gears S P through the medium of the sprocket-chain c, connecting the sprocket-wheel S' on shaft $S^2$ with sprocket-wheel D on the wheel of the wagon, as shown in Fig. 1. When the wagon travels forward, the distributer is rotated and throws the seed broadcast in the rear of the wagon.

The principal new features in the seeder described consist in the combination and arrangement of the perforated and slotted cap-plate B', perforated and slotted rotating disk L, and perforated and notched slides a. The other parts, except the sprocket-wheel D, we admit have been in use before, but not in combination with these new features described.

The new feature in the sprocket-wheel D consists in the mechanism by means of which it is centered over the hub of the wagon-wheel, so it can be applied readily to the center of the wheel. In order to accomplish that result, each spoke D' is provided with a slide, $D^2$. A central ring, $D^4$, attaches to each spoke by means of an integral stud passing up through the annular slot t, and each slide $D^2$ is attached to the central ring, $D^4$, by means of an integral stud passing through eccentric slots d. The slides $D^2$ project toward the center of the ring, and extend within it, as shown in Fig. 7. By partially rotating said ring the slides $D^2$ will be brought to bear simultaneously against the hub of the wagon-wheel by means of the integral studs on said slides passing through the eccentric slots d of said ring. By this method the sprocket-wheel can be at once centered over the hub of the wheel without any difficulty or delay, and then secured thereto by means of clips, as shown in Fig. 1.

Having thus described our invention, what we claim as new, and desire to secure by Letters Patent, is—

1. A broadcast seeding-machine consisting of the shaft $S^2$, provided with the sprocket-wheel S' and bevel-wheel S, vertical shaft J, provided with the bevel-pinion P and distributer F and agitator J', cap-plate B', having the seed-holes a' and slot z, circular revolving disk L, having the seed-holes v, holes m, and slot y, slides a, having the holes $a^2$ and notches $J^2$, and hopper H, all constructed and arranged as and for the purpose set forth.

2. In a broadcast seeding-machine, the combination of the table B, slides a, having the seed-holes $a^2$ and notches $J^2$, circular revolving disk L, having the two annular rows of seed-holes v, annular slot y, and holes m, cap-plate B', having the seed-holes a' and slot z, and hopper H, as and for the purpose set forth.

3. The sprocket-wheel D, having the spokes D', provided with the slides $D^2$, and slotted ring $D^4$, connected to said spokes and slides by means of studs integral therewith passing through the slots t and d in said ring, and adapted to be attached to the wagon-wheel, as and for the purpose set forth.

4. In combination with a seeding-machine, the sprocket-wheel D, having the spokes D', slides $D^2$, and plate $D^4$, adapted to operate said slides, substantially as and for the purpose set forth.

5. In a seeding-machine, the circular plate L, having the two annular rows of graduated seed-holes, and annular slot y, substantially as shown and described.

LLOYD EBERHART.
IRVING D. STEVENS.

Witnesses:
 THOMAS H. HUTCHINS,
 W. J. HUTCHINS.